Jan. 8, 1963   J. F. FLEISCHHACKER   3,072,143
CHECK VALVE
Filed Sept. 15, 1960   2 Sheets-Sheet 1
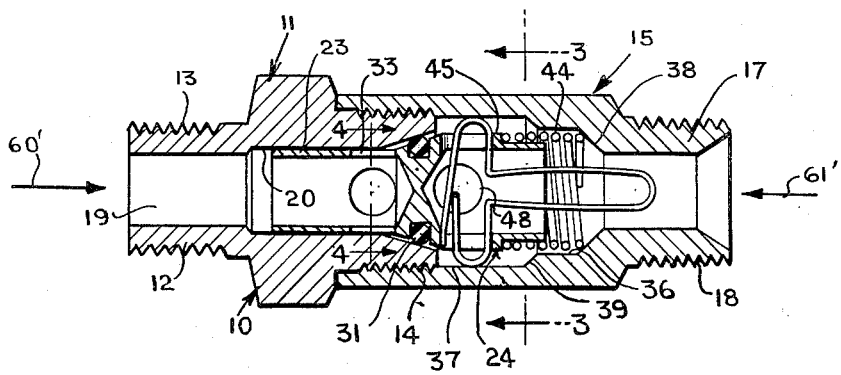
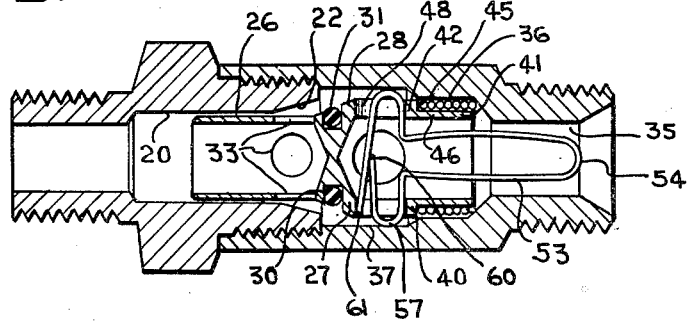
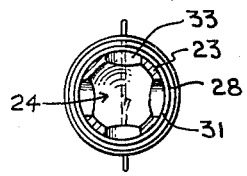
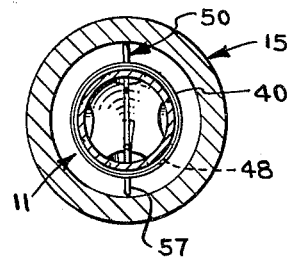
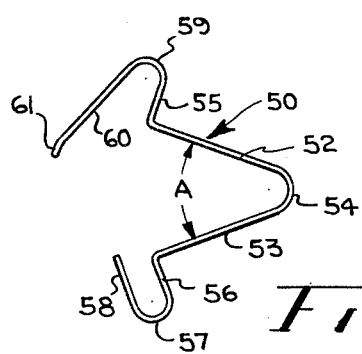
INVENTOR
JOSEPH F. FLEISCHHACKER
BY Dugger + Johnson
ATTORNEYS Jan. 8, 1963      J. F. FLEISCHHACKER      3,072,143
CHECK VALVE
Filed Sept. 15, 1960      2 Sheets-Sheet 2
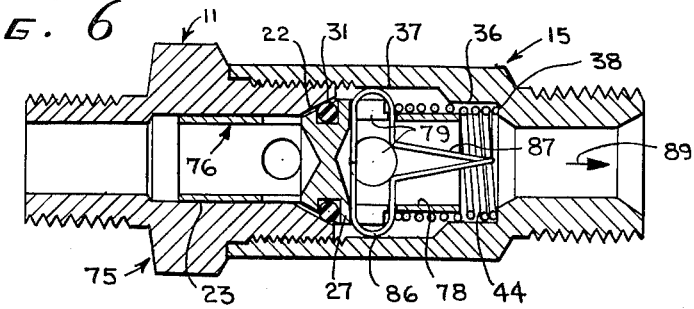
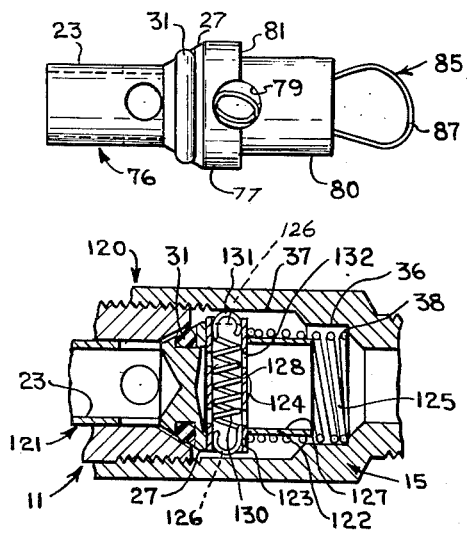
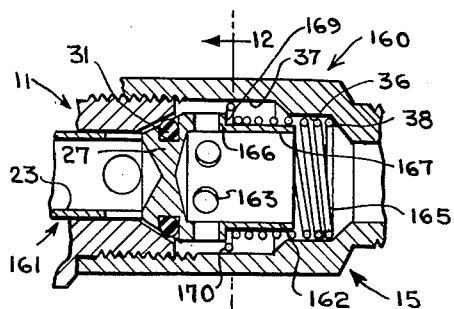
INVENTOR
JOSEPH F. FLEISCHHACKER
BY *Dugger & Johnson*
ATTORNEYS United States Patent Office
3,072,143
Patented Jan. 8, 1963

3,072,143
CHECK VALVE
Joseph F. Fleischhacker, Wayzata, Minn., assignor to
Tescom Corporation, a corporation of Minnesota
Filed Sept. 15, 1960, Ser. No. 56,238
3 Claims. (Cl. 137—514)

This invention relates to a check valve having new and improved vibration dampening mechanism. More particularly this invention relates to a check valve having vibration dampening mechanism which is axially movable in the check valve without end play between the check valve plunger and said mechanism.

In check valves of the prior art gaseous fluids flowing through the valves in the direction of the flow set up plunger oscillations which can result in objectionable audible sound or objectionable pulsations in gas flow from the valve outlet, or both. Further, prior art check valves are objectionable in that a certain amount of radial movement of the plunger is caused by the vibration dampening mechanism and thus such mechanism is not as effective as is desired, since the vibration dampening mechanism acting against the plunger frequently interferes with the proper seating of the valves. In order to overcome problems of the aforementioned nature this invention has been made.

It is an object of this invention to provide a new and improved check valve assembly having a minimum amount of vibrations or chattering of the moving parts resulting from gaseous fluids flowing through the valve. A further object of this invention is to provide for a check valve a new and improved vibration dampening device that is axially movable with the plunger without end play between said device and the plunger. It is still a further object of this invention to provide for a check valve a new and improved vibrational dampening device operative to damp vibrations by frictional engagement with the bore in which said device is mounted for movement.

It is still an additional object of this invention to provide for a check valve a new and improved vibrational dampening mechanism that does not cause radial movement of the plunger and interfere with the proper seating thereof to prevent fluid flow through the valve in a reverse direction. It is still another object of this invention to provide for a check valve new and improved vibration dampening mechanism that may be readily interchanged with mechanism of a similar construction to control the "dampening action" by a desired amount.

It is still a further object of this invention to provide a new and improved check valve assembly having a plunger mounted for movement relative to the oscillation dampening means. It is still an additional object of this invention to provide a new and improved check valve assembly in which the closing force on the plunger first is transmitted from the structure for urging the plunger to a closed position to the frictional element for dampening vibrations and then to the plunger.

Other and further objects are those inherent in the invention herein illustrated, described in the claims, and will be apparent as the description proceeds.

To the accomplishment of the aforegoing and related ends, this invention then comprises the features hereinafter fully described and particularly pointed out in the claims, the following description setting forth in detail certain illustrative embodiments, these being indicative, however, of but a few of the various ways in which the principles of the invention may be employed.

The invention is described with reference to the drawings in which the corresponding numerals refer to the same parts, and, in which:

FIGURE 1 is a longitudinal section through a check valve assembly having the new and improved vibrational dampening mechanism of the first embodiment of this invention, the check valve being shown in a closed position to prevent reverse flow of fluid;

FIGURE 2 is a longitudinal section through the check valve assembly of FIGURE 1 illustrating the plunger in an open position to permit the flow of fluid therethrough;

FIGURE 3 is a cross sectional view of the check valve assembly of FIGURE 1 taken along the line and looking in the direction of the arrows 3—3 of FIGURE 1;

FIGURE 4 is a cross sectional view of the plunger and vibration dampening mechanism of the first embodiment, said view being taken along the line and looking in the direction of arrows 4—4 of FIGURE 1;

FIGURE 5 is a plan view of the check valve friction spring of the first embodiment of this invention in a relaxed state;

FIGURE 6 is a longitudinal section through a check valve assembly having a new and improved vibration dampening mechanism of the second embodiment of this invention, the check valve being shown in a closed position;

FIGURE 7 is a side view of the plunger and dampening means of the second embodiment of this invention;

FIGURE 8 is a fragmentary longitudinal sectional view of a check valve assembly having the new and improved vibrational dampening mechanism of the third embodiment of this invention, the check valve being shown in a closed position;

FIGURE 9 is a fragmentary longitudinal sectional view through a check valve assembly having the new and improved vibrational dampening mechanism of the fourth embodiment of this invention;

FIGURE 10 is a fragmentary longitudinal sectional view through a check valve assembly having the new and improved vibrational dampening mechanism of the fifth embodiment of this invention;

FIGURE 11 is a fragmentary longitudinal sectional view through a check valve assembly having the new and improved vibrational dampening mechanism of the sixth embodiment of this invention;

FIGURE 12 is a cross sectional view of the check valve assembly of the sixth embodiment of this invention taken along the line and looking in the direction of the arrows 12—12 of FIGURE 11.

The check valve assembly of this invention, generally designated 10, includes a valve body 11 having at one end a nipple 12 threaded at 13 for connection to an appropriate fluid line (not shown). The forward end of the valve body has external threads 14 that form a matching fit with the internal threads at the back end of the valve outlet 15. A nipple 17 formed on the forward end of the outlet is threaded at 18 for connection to an appropriate fluid conduit (not shown).

The body is provided with an inlet port 19 that opens into the axial extending bore 20 formed in the forward end of the body. Surrounding the inner end of the bore 20 is a conical valve seat 22.

The body bore 20 is of a diameter and an axial length to slidably retain the tubular extension 23 of the plunger 24. In order that the extension of the plunger may be properly guided in the body bore, it is necessary that the outside diameter of the plunger extension be smaller than the inside diameter of the body bore whereby an annular space 26 exists between the adjacent portions of the body and the tubular extension, it being noted that the difference in the aforementioned diameters is exaggerated in FIGURE 2 for purposes of illustrating said annular space.

The plunger has a valve head 27 having a conical surface 28 which, upon seating upon the valve seat 22, cooperates therewith to close the valve, there being an annular groove 30 formed in the valve head to have an O-ring 31 mounted therein. The O-ring is of a diameter to extend radially outwardly beyond the adjacent portion of the valve head to provide a fluid seal between the valve head and the valve seat when the plunger is moved to a valve closed position (see FIGURE 1). Thus, in the closed position the conical surface normally is slightly spaced from the valve seat; however, if sufficient back pressure is exerted against the plunger, the O-ring is deformed to an extent to permit the conical surface seating directly against the valve seat.

The forward end of the tubular extension is formed integral with the back end of the valve head. A plurality of openings 33 are provided in the tubular extension adjacent the valve head to permit fluid to flow through port 19, next into the body bore 20, thence through the tubular extension and finally radially outwardly through said openings when the O-ring and conical surface 28 are spaced from the valve seat.

The outlet 15 has a port 35 formed in the forward end thereof; said port being in communication with the outlet bore 36 formed in the intermediate portion of the outlet. A shoulder 38 facing in a direction opposite the taper of the conical seat 22 is formed in the outlet at the location where the port 35 opens into the bore 36.

The outlet bore 36 at its rear end opens into the chamber 37, there being a second shoulder 39 that is located where the bore opens into said chamber. The second shoulder 39 also faces in a direction corresponding to the direction of the facing of the first shoulder 38.

The chamber 37 is of an axial length to extend from the second shoulder to the internally threaded portion of the outlet. The chamber 37 is of a greater diameter than the maximum diameter of the valve seat and also is of a diameter greater than the diameter of the cylindrical bore 36. The bore 36 in turn is of a substantially greater diameter than the adjacent portion of the port 35.

The plunger 24 includes a cylindrical portion 40 formed integral with the valve head to extend forwardly thereof, the center axis of said cylindrical portion being coextensive with the center axis of the tubular extension. An outer peripheral section of the forward end of the cylindrical portion is cut away to provide a reduced diameter end portion 41 of a diameter that moveably fits within the bore 36 and a main body portion 42 intermediate said reduced diameter end portion and the valve head. The outer diameter of the main body portion 42 is substantially smaller than the diameter of the outlet chamber but of a larger diameter than the outlet bore, while the outer diameter of the reduced end portion is substantially smaller than the diameter of the outlet bore, but greater than the diameter of the adjacent portion of the port 35. The axial length of the main body portion is substantially less than the axial length of the chamber 37 while the axial length of the reduced end portion is substantially less than the axial length of the valve bore. Due to the aforementioned diameters and axial lengths of the cylindrical portion 40, the chamber and the outlet bore, the shoulder 45 formed at the juncture of the reduced end portion with the main body portion can seat as a stop upon the second shoulder 39 and the forward edge of the reduced end portion is spaced a substantial distance from the adjacent portion of the first shoulder 38 when the valve is fully open.

The outlet bore and the reduced end portions are of sufficiently different diameters to permit one end of a coil spring 44 to bear against the first shoulder while the opposite end of the coiled spring seats against the above mentioned shoulder 45. The coiled spring constantly urges the plunger in a rearward direction to bring the O-ring into the sealing engagement with the valve seat 22.

A generally cylindrical recess 46 is formed in the cylindrical portion 40 and is of an axial length that corresponds to the axial length of said cylindrical portion. A plurality of diametrically opposed apertures 48 are formed in the cylindrical portion to place the recess in fluid communication with the chamber 37, said apertures being adjacent the valve head. A check valve friction spring 50 is located in the cylindrical recess and retained therein in a manner that will be set forth hereinafter, said check valve friction spring being a "hairpin" type spring.

The configuration of the check valve friction spring 50 in a relaxed condition is substantially as illustrated in FIGURE 5 and will be described relative to its relaxed condition. The check valve spring has a pair of legs 52, 53 which at their adjacent ends are formed integral with the opposite ends of the rounded web 54 to extend outwardly therefrom and diverge from one another. The opposite ends of the legs 52, 53 are bent at 55, 56 respectively to extend at right angles to said legs and outwardly from one another. The outer end of the right angle portion 56 is reversely bent to form a rounded portion 57 and then extends inwardly at 58, the members 56, 57 and 58 forming a looped end. The portion 58 diverges slightly relative to the right angle portion 56.

The outer end of the right angle portion 55 is reversely bent to form the rounded portion 59, then extends through portion 60 which forms a diverging acute angle with a plane parallel to the right angle portion 55, the members 55, 59, 60 and 61 forming a looped end. The outer end of the portion 50 is inwardly bent at 61. As may be noted in FIGURES 1 and 2, the overall length of portions 60, 61 is approximately the same as the outer diameter of the cylindrical portion 40. The radius of the rounded portions 57, 59 is selected so that the distance between portions 56, 58, and 55, 60 respectively is slightly less than the diameters of the apertures 48. That is, the radius of the rounded portions 57, 59 is only slightly less than one half of the diameter of an aperture 48.

Each of the legs 52, 53 is of a substantially greater length than the distance from the forward edge of the cylindrical portion 40 to an aperture 48. The legs are resiliently urged apart by the web 54 to tend to maintain the rounded portions 57, 59 spaced apart a greater distance than the inner diameter of said chamber. Thus, when the check valve friction spring is mounted in the cylindrical portion such that one rounded portion is located in an aperture 48 and the other rounded portion is located in an aperture 48 diametrically across from the aforementioned aperture with the legs 52, 53 extending forwardly of the plunger, the resiliency of the legs 52, 53 and the web 54 constantly urge the rounded portions 57, 59 into engagement with the adjacent portions of the chamber wall. Further, the resiliency of the right angle portion 55, rounded portion 59, and portions 60, 61 constantly urge the check valve friction spring to move in an axial direction forwardly of the plunger since the end portion 61 is resiliently held against the peripheral wall of one aperture 48 and the right angle portion 55 is resiliently held against the opposite wall of the aperture diametrically across from the first aperture 48. Thus there is no loose end play between the check valve friction spring and the plunger as the plunger and spring move relative to the body 11 and the outlet 15.

The structure of the first embodiment of the invention having been described, the operation thereof will now be briefly set forth. The check valve is provided in a fluid line to permit fluid flow in the desired direction (in the direction of the arrow 60') and to prevent reverse flow (in the direction of the arow 61'). That is, when the pressure in the port 19 exceeds the pressure in the port 35 plus the resistance of the coil spring 44, the plunger is forced to move in the direction of the arrow 60' whereby the valve head with the O-ring thereon is moved axially away from the valve seat 22. Due to the above described configuration of the check valve friction spring 50, any axial movement of the plunger is transmitted to the spring 50 to move said spring without any end play between the plunger and the check valve friction spring. Because of the resiliency of legs 52, 53 and web 54, the rounded portions 57, 59 are constantly urged to bear against the chamber wall in frictional engagement therewith. The rounded portions 57, 59 being in frictional engagement with the chamber wall dampens the movement of the plunger and thus any oscillations of the plunger. That is, the check valve friction spring acts as a deterrent (of predetermined magnitude) to the oscillations of the plunger and consequently "dampens out" the audible sounds and/or pulsations. From the foregoing, it is apparent that the check valve spring (and the corresponding spring members of the embodiments described hereafter) can be dimensioned so as to permit greater or less frictional engagement with the peripheral wall of the chamber, as may be required in the valves designed for higher or lower pressure ranges than the valve shown or for higher or lower flow ranges.

The plunger in moving in the direction of the arrow 60' compresses the spring 44 and continues to move in a forward direction until the shoulder 45 abuts against the shoulder 39. However, this does not interfere with the flow of fluid since the fluid flows through the opening 48 into the recess 46 and then into the port 35.

The plunger moving in the direction of the arrow 60' brings the openings 33 adjacent the conical valve seat whereby fluid may flow from port 19 into the hollow interior of the tubular extension and then radially outwardly through the openings 33 into the annular space between the valve seat 22 and the tubular extension. From the aforementioned annular space, fluid flows axially into the annular space intermediate the cylindrical portion and chamber wall of the outlet and thence radially inwardly through the openings 48 into the recess 46. The fluid in the recess 46 flows axially in the direction of arrow 60' into the port 35 and then to the fluid conduit connected thereto (not shown).

As the plunger moves between a fully closed position wherein the O-ring bears against the valve seat and a fully open position wherein the shoulder 45 bears against the shoulder 39, the tubular extension guides in the bore 20, but at the same time there is an annular space 26 between the extension and the bore wall. Since the check valve friction spring, which acts as a vibration dampening device, is tied in with the axial movement of the plunger and does not cause any radial movement of the plunger as the plunger moves, said spring will have no effect upon the seating of the valve. Thus, in effect, the valve plunger is free to float within the limits of the annular space 26 and the spring 50 does not interfere with the proper seating of the valve.

If the pressure in port 19 is reduced to a level below the pressure in port 35 (acting in the direction of arrow 61') plus the force of the spring acting in the same direction, the spring 44 will move the plunger in the direction of arrow 61' to seat the valve. The aforementioned seating of the valve will bring the O-ring 31 into engagement with the valve seat 22 to prevent the flow of fluid through the check valve in the direction of the arrow 61. If an overly high fluid pressure is exerted in the direction of the arrow 61', the O-ring 31 will be sufficiently compressed to permit the conical surface 25 to abut against the valve seat 22.

Even though the gaseous fluid flow through the check valve in the direction of the arrow 60' sets up plunger oscillations which, if not restrained, could result in objectionable sounds or objectionable pulsations in the gas flow from the valve outlet, or both, the check valve friction spring 50, which is in constant frictional engagement with the outlet, acts to dampen out the vibrations without interfering with the proper seating of the valve in the check valve. Due to the construction of the plunger and the check valve friction spring, the dampening action takes place without independent movement of the check valve friction spring relative to the plunger.

The structure and operation of the first embodiment of this invention having been set forth, the structure of the second embodiment will now be described. The second embodiment of this invention, generally designated 75, includes a body 11 and an outlet 15 of the same construction as that previously described. Mounted in the hollow interior of the body and outlet for limited movement relative thereto is a plunger 76. Since the plunger 76 is basically of the same construction as the plunger 24 it will only be briefly described other than for the differences in construction. Plunger 76 includes a tubular extension 23, a valve head 27 having an O-ring 31 in a peripheral groove, and a forwardly extending cylindrical portion 77. Diametrically opposed sets of apertures 79 are provided in the cylindrical portion adjacent the valve head to place the cylindrical recess 78 of the cylindrical portion in direct fluid communication with the chamber 37 of the outlet.

A torsion type friction spring 85 is mounted in the cylindrical recess to have the transversely extending looped end portions 86 extend radially through one set of diametrically opposed apertures 79 to bear against the inner peripheral wall of the chamber, the outside radius of curvature of the web portion of the looped ends being smaller than the radius of an aperture 79. The forwardly extending central twisted loop portion 87 of the torsion spring extends in a longitudinal direction outwardly in front of the cylindrical portion 77. It is to be noted that the free ends of the looped end portions are adjacent one another when the friction spring is mounted in the plunger (see FIGURE 6).

An advantage of using the torsion spring 85 over the spring 50 is that it is easier to mount it in the plunger and less stress is concentrated in the apex portion of the torsion spring than in the corresponding portion of the spring 50.

The cylindrical portion is turned down at its outer end to form a reduced end 80. At the junction of the reduced end with the remaining portion of the cylindrical portion there is formed a shoulder 81, it being noted that the forward portion of the apertures 79 are formed in the back portion of the reduced end. One end of a coiled spring 44 is mounted on the reduced end to bear against the adjacent legs of the looped ends while the opposite end of the coiled spring seats on the shoulder 38, it also being noted that the outside diameter of the coil spring is less than the inside diameter of the bore 36 and thereby permits limited transverse movement of the cylinder portion relative to the bore 36 as the plunger is moved in a forward direction (arrow 89).

The operation of the second embodiment of check valve assembly 75 is similar to that of the first embodiment and will therefore not be described other than to mention that the force for moving the plunger to a closed position is transferred from the coil spring to the torsion spring and then from the torsion spring to the plunger. This is in contrast to the first embodiment wherein the closing force is transferred directly from the coil spring to the plunger.

The third embodiment of the invention, generally designated 100, includes a body 11, an outlet 15, and a plunger 101 having a tubular extension 23, a valve head 27, and a cylindrical portion 106. The O-ring 31 is mounted in the peripheral groove formed in the valve head.

Since the construction of the outlet, body and plunger is similar to that of the corresponding parts of the first two embodiments of the invention, the aforementioned members will not be described in detail other than to set forth the differences in construction. Two sets of diametrically opposed apertures 103 are formed in the cylindrical portion 106 to open into the cylindrical recess 107, one set of apertures being adjacent the valve head and the second set located axially forward of said one set. The recess 107 corresponds to the recess 78 formed in the plunger of the second embodiment.

A sleeve 108 of an axial length greater than the maximum diameter of the valve head is mounted to extend radially outwardly through diametrically opposed apertures 104, said apertures being adjacent the valve head and opening into recess 107. The sleeve is of an axial length to leave a space between the opposite ends thereof, and the adjacent portions of the chamber wall. The second set of apertures 103 are provided to compensate for obstruction of fluid passages through aperture 104 due to the sleeve being located therein.

The cylindrical portion has a reduced end 102 on which the coiled spring 105 is mounted. One end of the coiled spring bears against the end portions of the sleeve that extend outwardly through the apertures 104 while the opposite end of the coiled spring bears against the shoulder 38 of the outlet.

Located within the intermediate portion of the sleeve 108 is a coiled spring 110 that at either end resiliently urges a ball 111 into constant frictional contact with the adjacent portions of the chamber wall. Each end of the sleeve is pinched at 109 to maintain the balls 111 and the spring 110 within the confines of such sleeve.

The fourth embodiment of the invention, generally designated 120, includes a body 11, an outlet 15, and a plunger 121 which are generally of the same construction as the check valve assembly 10 except for the differences set forth hereinafter. The plunger 121 has a tubular extension 23, a valve head 27 with a peripheral groove for mounting O-ring 31 and a cylindrical portion 126. A pair of diametrically opposed apertures 124 are formed in the cylindrical portion adjacent the valve head to place the rear end of the cylindrical recess 127 of the cylindrical portion in fluid communication with the adjacent portion of the chamber 37.

A pair of diametrically opposed apertures 123 are formed in the inner portion of the cylindrical portion intermediate apertures 124. A sleeve 128 of an axial length greater than the maximum diameter of the valve head but of a substantially smaller diameter than the inside diameter of chamber 37 is positioned in the apertures 123 to extend outwardly there beyond. A coiled spring 130 having somewhat semi-circular looped ends 131 is located in the sleeve. The axial length of the coiled spring in a relaxed state is substantially greater than the diameter of the chamber 37 while the outside diameter of the spring is slightly smaller than the inside diameter of the sleeve 128. As a result the looped ends are resiliently held in frictional engagement with the peripheral wall of the chamber 37. Diametrically opposed openings 132 are formed in the sleeve adjacent each opposite end thereof to permit fluid flow from the chamber 37 through the open ends of the sleeve and then through openings 132 into the cylindrical recess 127.

The cylindrical portion 126 has a reduced end 122 of an axial length to permit the coiled spring 125 to be mounted thereon and to have one end of said spring bear against the end portions of sleeve 128. The opposite end of the coiled spring 125 bears against shoulder 38.

The fifth embodiment of this invention, generally designated 140, includes a body 11, an outlet 15, and a plunger 141 which are generally of the same construction as the fourth embodiment with the exceptions set forth hereinafter. The plunger 141 includes a tubular extension 23, a valve head 153 having a peripheral groove in which an O-ring 31 is mounted and a cylindrical portion 146. A cylindrical recess 147 which is formed in the cylindrical portion 146 is of a substantially shorter axial length than said cylindrical portion. A pair of diametrically opposed apertures 144 are formed in the cylindrical portion adjacent the inner end of the recess to place said inner end in fluid communication with the chamber 37.

Formed in the cylindrical portion intermediate the valve head and inner end of the recess is a diametrically extending bore 154. A coiled spring 150 having somewhat semicircular looped ends 151 is located in the diametric bore, said spring being of sufficient length to maintain the web portions of the looped ends in frictional engagement with the adjacent peripheral wall of the chamber 37. Spaced axial openings 152 are formed in the cylindrical portion to place the recess in fluid communication with the diametric bore 154 whereby a fluid channel is established from the chamber 37 through the diametric bore and opening 152 into the recess.

The cylindrical portion has a reduced end 142 which forms a shoulder 149 at the junction of the reduced end with the remaining part of the cylindrical portion, said shoulder being located axially between the diametric bore and the inner end of the recess. The coiled spring 145 is mounted on the reduced end to have one end abut against the shoulder 149 and the opposite end abut against the shoulder 38.

The sixth embodiment of the invention, generally designated 160 includes a body 11, an outlet 15 and a plunger 161 which are generally of the same construction as the first embodiment except for differences set forth hereinafter. The plunger 161 includes a tubular extension 23, a valve head 27 having a peripheral groove for mounting the O-ring 31, and a cylindrical portion 166. A cylindrical recess 167 is formed in the cylindrical portion similarly as the recess of the first embodiment. A plurality of circumferentially spaced apertures 163 are provided at the inner end of the cylindrical portion to place the inner end of the recess in fluid communication with the chamber 37. The cylindrical portion has a reduced end 162 that forms a shoulder 169 axially forwardly of the apertures 163. A somewhat triangular shaped spring member 170 is positioned over the reduced end to abut against the shoulder 169. The spring member 170 has rounded apex portions 170a that are constantly resiliently urged into frictional engagement with the inner peripheral wall of the chamber 37. The intermediate portions of each leg of the spring member are located closely adjacent to the outer peripheral wall of the reduced end. A coiled spring 165 is mounted on the reduced end to have one end bear against the spring member 170 and the opposite end thereof abut against the shoulder 38.

In each of the embodiments of this invention an annular space 26 exists between the tubular extension and the body bore even though said space is only clearly shown in FIGURE 2. Likewise, the outside diameter of the cylindrical portion of each embodiment, and the inside diameter of the outlet bore, and the dimensions of the coil spring mount of the reduced end of each of the respective cylindrical portions are selected to permit limited transverse movement of the cylindrical portion as the plunger moves between a forward and a rearward position. The aforementioned transverse movement can take place without the vibration dampening means moving out of frictional engagement with diametrically opposed portions of the chamber wall. Thus the plunger closing force is exerted on the plunger independent of the vibration dampening force. As a result, the valve plunger is free to "float within the limits of the annular space 26" and thus the seat "finds itself" without any interference from the friction means. In the second and the sixth embodiments, the closing force of the coiled spring is first transmitted from said coiled spring to the friction element and then to the plunger.

It is to be noted that in each of the embodiments of the invention there are provided radial apertures and/or transverse and axial openings to permit the free flow of fluid from the chamber 37 into the inner end of the recess of the cylindrical portion. As a result, when the plunger is moved to an open position the resistance to flow of fluid through the body and outlet is minimized.

Also it is to to be noted in the second embodiment that the coiled spring would tend to compress the curved loops 86 as the plunger is moved in a forward direction.

As many widely apparently different embodiments of this invention may be made without departing from the spirit and scope thereof, it is to be understood that I do not limit myself to the specific embodiments herein.

What I claim is:

1. Check valve apparatus comprising a body having a port at the back end and a bore at the other end opening into said port, said bore being shaped to provide a forwardly facing valve seat, an outlet connected to said other end of the body and having a port at one end and a chamber at the other end which opens to the outlet port and the body bore, said body port and outlet port being of smaller diameters than the diameter of the chamber, a plunger at least partially slightly retained in the chamber, said plunger having a valve head adapted to seat on the valve seat to prevent fluid flow from the chamber into the body bore and a hollow cylindrical portion extending axially away from the valve head toward the outlet port and located at least in part in said chamber, said cylindrical portion having an outer diameter substantially less than the inner diameter of the chamber and two diametrically opposed apertures in the chamber in fluid communication with the hollow interior of the cylindrical portion, resilient means mounted in the outlet to constantly urge the plunger to seat the valve head on the valve seat, and means mounted on a plunger for frictionally engaging the outlet to act as a deterrent to oscillations of the plunger in the chamber, said deterrent means including a spring mounted in the interior of the cylindrical portion, said spring having rounded portions extending radially outwardly through said apertures to bear against the chamber wall.

2. In a check valve having a longitudinally extending fluid channel formed therein, a valve seat formed around said channel, a valve member having a valve head contoured to seat against the valve seat to block fluid flow through said channel in one direction, and a hollow cylindrical portion that at one end is formed integral with the valve head and is open at the opposite end, said cylindrical portion having diametrically opposed transverse apertures formed adjacent the valve head, and means mounted on said valve member to move therewith for deterring any oscillations of said valve member, said deterrent means comprising a spring mounted in the hollow interior of the cylindrical portion and having a forwardly extending reversely bent web and rounded transversely end portions resiliently urged into constant engagement with transversely opposed portions of said channel by said web portion, said end portions each having a radially inwardly extending leg formed integral with an opposite end of the web portion and extending outwardly through one of the apertures, said radially extending legs in combination with the spacing of the ends of the web portion in a relaxed condition being greater than the transverse distance across the adjacent portions of the fluid channel, said valve member and fluid channel being shaped relative to each other to retain the valve member in the fluid channel and permit fluid flow in the direction opposite said one direction when the valve head is displaced from the valve seat.

3. The structure of claim 2 further characterized in that the check valve has a shoulder formed in the end opposite from the valve seat and facing the valve seat, that the cylindrical portion has a reduced outer diameter end portion, and that the means for urging the valve head to a seated portion has one end bearing against the shoulder portion and an opposite end bearing against the shoulder formed by the reduced diameter end portion for constantly urging the valve head to seat on the valve seat, said valve head having an O-ring therein to form a fluid seal with the valve seat.

References Cited in the file of this patent
UNITED STATES PATENTS

| | | |
|---|---|---|
| 193,558 | Shaw | July 24, 1877 |
| 645,722 | Holmes | Mar. 20, 1900 |
| 997,296 | Isenberg | July 11, 1911 |
| 2,005,813 | Thorsen | June 25, 1935 |
| 2,103,725 | Jacobsen | Dec. 28, 1937 |
| 2,190,464 | Wile | Feb. 13, 1940 |
| 2,206,356 | Hutchings | July 2, 1940 |
| 2,338,760 | Deming | Jan. 11, 1944 |
| 2,650,793 | Clark | Sept. 1, 1953 |
| 2,801,801 | Gillick et al. | Aug. 6, 1957 |

UNITED STATES PATENT OFFICE
CERTIFICATE OF CORRECTION

Patent No. 3,072,143                      January 8, 1963

Joseph F. Fleischhacker

It is hereby certified that error appears in the above numbered patent requiring correction and that the said Letters Patent should read as corrected below.

Column 9, line 12, for "slightly" read -- slidably --.

Signed and sealed this 6th day of August 1963.

(SEAL)
Attest:

ERNEST W. SWIDER
Attesting Officer

DAVID L. LADD
Commissioner of Patents